UNITED STATES PATENT OFFICE.

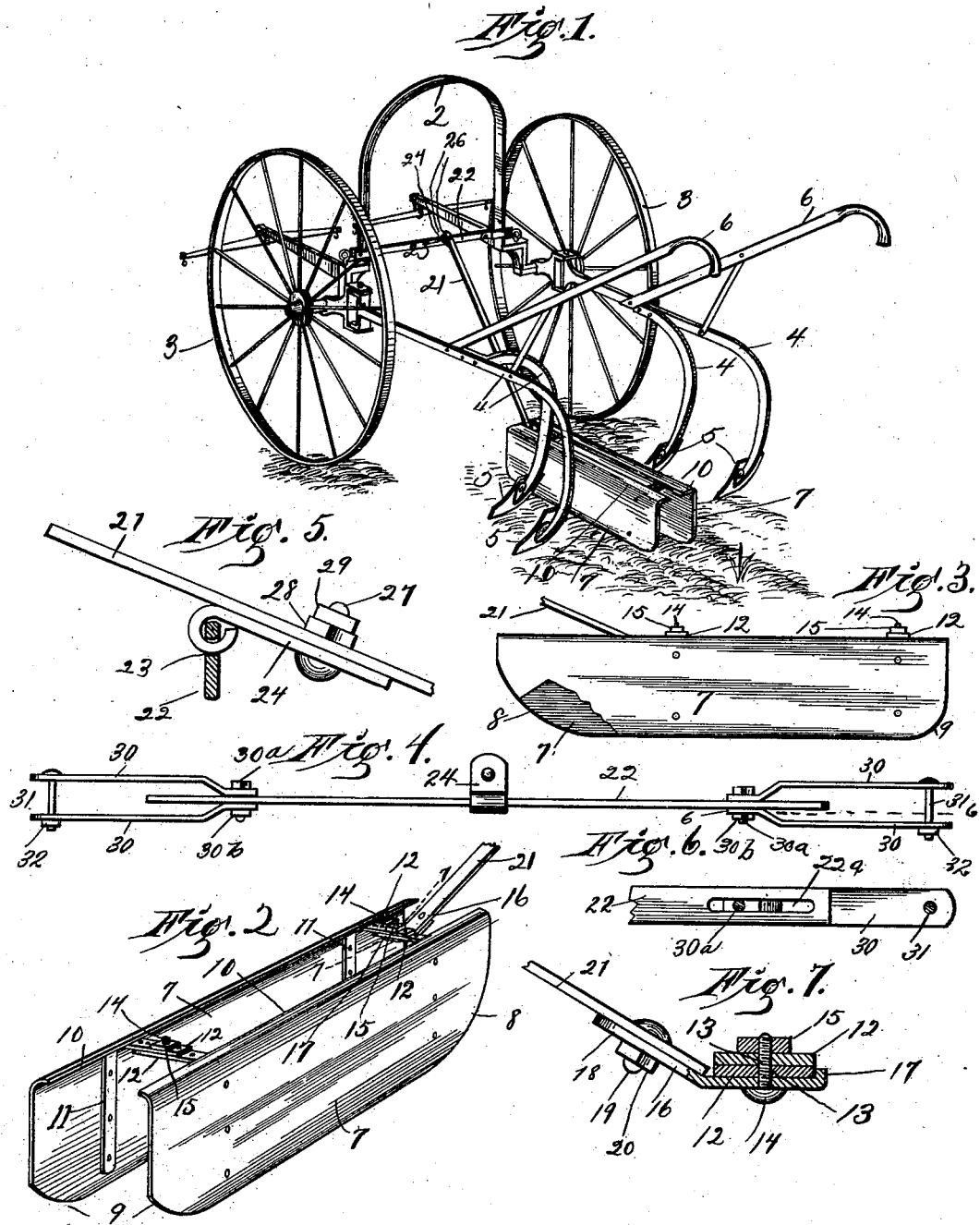

JOHN T. T. KISINGER, JR., OF BELTON, MISSOURI.

FENDER ATTACHMENT.

SPECIFICATION forming part of Letters Patent No. 503,242, dated August 15, 1893.

Application filed December 16, 1892. Serial No. 455,409. (No model.)

*To all whom it may concern:*

Be it known that I, JOHN T. T. KISINGER, Jr., of Belton, Cass county, Missouri, have invented certain new and useful Improvements in Fender Attachments for Cultivators, of which the following is a full, clear, and exact description, reference being had to the accompanying drawings, forming a part hereof.

My invention relates to improvements in guard attachments, for corn cultivators, and my object is to provide a device, which may be easily attached to or detached from a corn cultivator, preferably of the construction shown in the accompanying drawings but which may be applied to any cultivator of suitable construction, to protect the young corn, from the hardened clods or other heavy portions of earth, upturned by the shovels of the cultivator, while the cultivation of the corn is in progress; and further to produce a device which is simple and inexpensive of construction, and durable and effective in operation.

To the above purposes, my invention consists in certain peculiar features of construction and arrangement, as will be hereinafter described and claimed.

In order that my invention may be fully understood, I will proceed to describe it with reference to the accompanying drawings, in which—

Figure 1. is a perspective view of a cultivator, and showing my attachment applied thereto in operative position, for guarding the corn. Fig. 2. is a detached perspective view of the guard attachment. Fig. 3. is a side elevation of the guard attachment, partly broken away, to expose the opposite side thereof. Fig. 4. is a top plan view, enlarged, of the transversely extending clamping bar, by which the attachment is connected to the cultivator. Fig. 5. is a side elevation of the upper and inclined bar which connects the attachment to the clamping bar, and showing said clamping bar in section. Fig. 6. is a sectional view, taken on the line 6—6 of Fig. 4. Fig. 7. is a vertical sectional view, taken on the line 7—7 of Fig. 2.

In the drawings, 1 designates a cultivator of the ordinary or any preferred construction, which is provided with the transversely-extending and inverted U-shaped frame 2, the lower ends of which are connected in any suitable manner to the inner ends of the oppositely disposed axle bars, upon which is mounted in the usual manner the carrying wheels 3.

Extending rearwardly from the axle bars, are the cultivator arms 4, a suitable distance apart, which may be arranged in pairs as shown, or in any other suitable manner, and which are provided with the usual shovels 5 at their lower ends. Extending rearwardly and upwardly from the horizontal portion of the cultivator arms, and suitably braced thereto are the handles 6.

The corn protecting attachment is located a suitable distance in the rear of the carrying wheels of the cultivator, and midway between the shovels at the lower end of the cultivator arms; and consists of the longitudinally extending and vertically arranged, parallel side walls or runners 7—7 preferably of sheet metal, which have their front and rear ends rounded at the lower ends thereof, at 8 and 9 respectively, so that the device may be drawn as a sled over the ground, and ride over any ordinary obstructions, which may be in the path of the attachment. The upper ends of the vertically arranged sides, are flanged or bent inwardly at 10, to strengthen or stiffen the device, and near the opposite ends and at their inner sides, the side walls or runners are provided with oppositely disposed angle brackets, the vertical arms 11 of which are secured by rivets or other suitable means to the said side walls, and the horizontal arms 12 of the brackets extend inwardly, one above the other, and are provided with a series of aligned openings or holes 13, through which are inserted upwardly, bolts 14, the projecting ends of which are engaged by retaining nuts 15. By this arrangement it will be seen that the width of the device may be increased or diminished, when necessary or convenient.

Fitting against the under side of the lower horizontal arm, at the front end of the device, and extending longitudinally forward therefrom, is a strap iron 16, the rear end of which is turned or bent upwardly at 17, against the rear edge of the lower horizontal bracket arm 12, and the forward bolt 14, also passes up through the body portion of said strap. The forward end 18 of the strap, is also bent upwardly at a suitable angle from the body-portion, and the rear or lower end of a connecting bar 21, is pivotally connected thereto, by the bolt 19 passing through aligned openings in the strap and the bar, and its projecting end being engaged by a nut 20. A transversely arranged and horizontal bar 22, is provided with a central slot 23, and the upper end of the short strap 24 is bent around and through said slot at 25, thus giving the strap a vertical pivotal connection with the transverse bar 22. The upper end of the connecting bar 21, is provided with a series of apertures or holes 26, any one of which is adapted to register with an aperture or hole in the rear end of the strap, and a bolt 27, is inserted upwardly through said aligned apertures or holes, and the projecting end is engaged by the adjusting and locking nuts 28 and 29, respectively, to allow of a pivotal lateral movement. The opposite ends of the transversely and horizontally arranged bar 22 are provided with horizontal slots 22ª, and are adjustably secured between the inner ends of horizontally arranged spring bars 30 by bolts 30ª passing through said spring bars, and also through the slots in the end of the horizontal bar, and clamping nuts 30ᵇ which are screwed upon the projecting ends of the bolts. The outer ends of the clamping bars engage on opposite sides of the vertical arms of the U-shaped frame 2 of the cultivator, and bolts 31 are passed through aligned openings, in the said bars, at the outer sides of the said frame, and clamping nuts 32, engage the projecting ends of the bolts. This connection with the U-shaped frame, allows of the vertical adjustment of the guard attachment, and the longitudinally arranged series of apertures or holes in the upper end of the connecting bar 21, allows the guard attachment to be adjusted longitudinally, relative to the cultivator.

When the cultivation of the young corn is in progress, my guard or fender attachment, being connected to the cultivator as described, is designed to run directly between the shovels thereof, and on each side of the corn, and thus protect the shoots of young corn, from the hardened clods, stones and heavy quantities of earth upturned by said shovels, and which will, as the guard attachment passes onward, fall gradually and easily around the roots of the corn, and without endangering it in the slightest degree.

From the above description, it will be seen that I have provided a guard or fender attachment for young corn, which is simple and inexpensive of construction, and which will protect the corn effectually while the cultivation thereof is in progress.

Having thus described my invention, what I claim as new, and desire to secure by Letters Patent, is—

1. In a guard attachment for cultivators, the combination with a fender constructed as described, and a bar 21 pivotally connected to the fender, of a bar 22 slotted near each end, and spring-bars adapted to fit against opposite sides of the U-frame of the cultivator, and bolts passing through said spring-bars and through the slots of the bar 22, and bolts passing through the outer ends of the spring-bars, and engaged by nuts to clamp said spring-bars against the U-frame of the cultivator, substantially as set forth.

2. In a guard attachment for cultivators, the combination with a fender constructed as described, and a bar carried by the frame of the cultivator, and having a central opening, of a strap 24 passing through said opening and pivotally engaging said bar, and a bar 21 pivotally connected to the fender and pivotally connected to the strap 24, so that a lateral and vertical movement may be obtained, substantially as set forth.

In testimony whereof I affix my signature in the presence of two witnesses.

JOHN T. T. KISINGER, Jr.

Witnesses:
MAUD FITZPATRICK,
M. P. SMITH.